United States Patent
Becker

(10) Patent No.: US 10,241,202 B2
(45) Date of Patent: Mar. 26, 2019

(54) REDUCTION OF RECEIVE DATA OF A RADAR, IN PARTICULAR, A SYNTHETIC APERTURE RADAR

(71) Applicant: Airbus DS GmbH, Taufkirchen (DE)

(72) Inventor: Thomas Becker, Constance (DE)

(73) Assignee: AIRBUS DS GMBH, Taufkirchen (DE)

( * ) Notice: Subject to any disclaimer, the term of this patent is extended or adjusted under 35 U.S.C. 154(b) by 644 days.

(21) Appl. No.: 14/941,196

(22) Filed: Nov. 13, 2015

(65) Prior Publication Data
US 2016/0139261 A1    May 19, 2016

(30) Foreign Application Priority Data
Nov. 14, 2014 (EP) .................................... 14003841

(51) Int. Cl.
| | | |
|---|---|---|
| *G01S 13/28* | (2006.01) | |
| *G01S 13/90* | (2006.01) | |
| *G01S 7/288* | (2006.01) | |
| *G01S 7/295* | (2006.01) | |

(52) U.S. Cl.
CPC .......... *G01S 13/9035* (2013.01); *G01S 13/90* (2013.01); *G01S 7/288* (2013.01); *G01S 7/295* (2013.01); *G01S 13/282* (2013.01)

(58) Field of Classification Search
CPC .... G01S 13/90; G01S 13/9035; G01S 13/282; G01S 13/286
See application file for complete search history.

(56) References Cited

U.S. PATENT DOCUMENTS

| | | | | |
|---|---|---|---|---|
| 4,851,848 A | * | 7/1989 | Wehner | G01S 13/24 342/179 |
| 4,910,520 A | * | 3/1990 | Rosen | G01S 13/90 342/25 A |
| 5,191,344 A | * | 3/1993 | Moreira | G01S 13/90 342/195 |

(Continued)

FOREIGN PATENT DOCUMENTS

CN       104237857 A       12/2014

OTHER PUBLICATIONS

European Search Report issued in counterpart European Application No. 14003841.5 dated Apr. 24, 2015, with Statement of Relevancy (Twelve (12) pages).
Albrecht et al.: "Application of momentary Fourier transform to SAR processing", IEE Proceedings: Radar, Sonar & Navigation, Institution of Electrical Engineers, GB, Bd. 146, Nr. 6, Dec. 2, 1999 (Dec. 2, 1999), pp. 285-297, XP006013693.
Chot Hun Lim et al.: "A new data acquisition and processing system for UAVSAR", IEICE Electronics Express, Bd. 8, Nr. 20, Jan. 1, 2011 (Jan. 1, 2011) pp. 1716-1722, XP055183641.

(Continued)

*Primary Examiner* — Peter M Bythrow
(74) *Attorney, Agent, or Firm* — Crowell & Moring LLP

(57) ABSTRACT

A method for the reduction of receive data of a radar includes receiving a radar echo signal emanating from a chirp-like transmit signal and specifying a temporal receive window of the radar echo signal as a function of an area to be detected by a radar. The method also includes dividing the received radar echo signal into a plurality of spectral sub-bands, determining sub-band windows for each of the plurality of spectral sub-bands, activating the sub-band windows within the temporal receive window of the radar echo signal as a function of a receive time of the radar echo signal, and then sampling the radar echo signal using a sampling (Continued)

rate that is adjusted as a function of a number of sub-band windows active at a respective sampling instance.

19 Claims, 6 Drawing Sheets

(56) References Cited

U.S. PATENT DOCUMENTS

| | | | | |
|---|---|---|---|---|
| 6,072,419 | A * | 6/2000 | Normant | G01S 13/282 |
| | | | | 342/194 |
| 6,087,981 | A * | 7/2000 | Normant | G01S 13/282 |
| | | | | 342/131 |
| 6,477,553 | B1 * | 11/2002 | Druck | H03M 1/1265 |
| | | | | 341/123 |
| 7,764,218 | B2 * | 7/2010 | Kruys | G01S 7/021 |
| | | | | 342/13 |
| 8,861,588 | B2 * | 10/2014 | Nguyen | G01S 13/90 |
| | | | | 341/155 |
| 9,379,726 | B1 * | 6/2016 | Wang | H03M 1/125 |
| 9,398,587 | B1 * | 7/2016 | Kong | H04W 72/044 |
| 9,684,071 | B2 * | 6/2017 | Wishart | G01S 13/9011 |
| 2005/0068226 | A1 * | 3/2005 | Shinonaga | G01S 13/282 |
| | | | | 342/134 |
| 2007/0285302 | A1 * | 12/2007 | Aarseth | G01S 13/282 |
| | | | | 342/25 R |
| 2009/0109086 | A1 * | 4/2009 | Krieger | G01S 13/9035 |
| | | | | 342/25 F |
| 2011/0066053 | A1 * | 3/2011 | Yazicioglu | A61B 5/0428 |
| | | | | 600/509 |
| 2012/0250748 | A1 * | 10/2012 | Nguyen | G01S 13/0209 |
| | | | | 375/224 |
| 2014/0009326 | A1 * | 1/2014 | Wishart | G01S 13/90 |
| | | | | 342/25 D |
| 2014/0086365 | A1 * | 3/2014 | Mackerron | G01S 7/292 |
| | | | | 375/340 |
| 2014/0111374 | A1 * | 4/2014 | Case | G01S 13/90 |
| | | | | 342/25 F |

OTHER PUBLICATIONS

Curlander et al. "Synthetic Aperture Radar: Systems and Signal Processing", Published by John Wiley & Sons, Inc., Nov. 1991, 672 pages.

Dale et al.: "Developments in Radar Imaging", IEEE Transactions on Aerospace and Electronic Systems, IEEE Service Center, Piscataway, NJ, US, Bd. AES-2, Nr. 4, Jul. 1, 1984 (Jul. 1, 1984), pp. 363-400, XP011211740.

Karp et al.: "Modified DFT Filter Banks with Perfect Reconstruction", IEEE Transactions on Circuits and Systems II: Analog and Digital Signal Processing, 1999, vol. 46, No. 11, Nov. 1999, pp. 1404-1414.

Kelly et al.: "Advanced image formation and processing of partial synthetic aperture radar data", IET Signal Processing, The Institution of Engineering and Technology, Michael Faraday House, Six Hills Way, Stevenage, Herts, SG1 2AY, UK, Bd. 6, Nr. 5, Jul. 6, 2012 (Jul. 6, 2012), pp. 511-520, XP006040184.

Mittermayer, Josef: "Simulation eines Sotlight-Bildes aus Stripmap-Rohdaten" In: "Hochaufloesende Verarbeitung von Radarsystemen mit sythetischer Apertur", Aug. 17, 2000 (Aug. 17, 2000), Deutsches Zentrum fuer Luft-und Raumfahrt e. V., Koeln, XP055183605, ISSN: 1434-8454, Bd. 2009-29, pp. 157-174.

Sack et al. "Application of efficient linear FM matched filtering alggorithms to synthetic aperture radar processing", IEE Proceedings F. Communications, Radar & Signalprocessing, Institution of Electrical Engineers. Stevenage, GB, Bd. 1, Nr. 132, Feb. 1, 1985 (Feb. 1, 1985), p. 45-57, XP002075592.

* cited by examiner

REDUCTION OF RECEIVE DATA OF A RADAR, IN PARTICULAR, A SYNTHETIC APERTURE RADAR

CROSS REFERENCE TO RELATED APPLICATIONS

This application claims priority under 35 U.S.C. § 119 from German Patent Application No. 14 003 841.5-1812, filed Nov. 14, 2014, the entire disclosure of which is herein expressly incorporated by reference.

BACKGROUND AND SUMMARY OF THE INVENTION

The present invention relates to a method for the reduction of receive data of a radar, in particular, a synthetic aperture radar (SAR) and to a receiver for data of a radar, in particular, and SAR according to the independent claims.

On flying radar platforms, the reduction of received radar data is a necessity resulting from the mission requirements on the one hand and the limited downlink capacities on the other. The data reduction may also be advantageous for radar systems in other applications, for example, to reduce the cost of archiving.

An example for a flying radar platform is the SAR which, for example, samples the surface of the earth by way of a moving antenna. The SAR transmits transmit pulses for the sampling and receives the radar echo pulses. Thus, the transmit pulses reflect on the sampled objects (targets). For each area illuminated and sampled by the antenna, a SAR processor calculates, by respectively processing the data of the echo signals (target echoes), an image of the sampled area. A SAR is, for example, used to measure and image the earth surface. The transmit pulses transmitted by a SAR are typically chirp pulses, in particular, linear frequency modulated pulses. A satellite, or a different aircraft or a different flying object flying at a sufficient height above the earth surface or the surface of a planet, may be used as a flying platform for a SAR.

FIG. 1 illustrates the aspects relevant for a data reduction of the (radar) echo signals or receive data for a flying SAR platform. Area 16 (rectangular area in FIG. 1 which lies within the oval area) desired for the image generation is defined within area 14 (oval area in FIG. 1) which is illuminated by transmit pulses 10 of a SAR system 12. As a result, there is a closest and a furthermost target 18 or 20, the latter of which may be present multiple times depending on the geometry of the scene. An echo signal 22 or 24 from the closest and the furthermost target is obtained in the receiver of SAR system 12 such as it was generated in the transmitter of SAR system 12. A possible Doppler shift may here be ignored. All echoes emanating from targets which lie in between are situated in between said targets. Targets which lie outside of the desired area, yet are still inside the illuminated area, display chirps in the receive signal which lie in front of the closest or after the furthermost target.

FIG. 2 illustrates the assignment of the targets to the receive signal in a time-frequency diagram of the frequency spectrum of the received radar echo signals. The bandwidth is determined by the spectrum of the chirp signals used as radar signals. The receive window for the radar echo signals is a function of the desired area 16. In other words, radar echo signals are received from desired area 16 within the receive window. In order to evaluate the radar echo signals, only the dark-shaded signal part is needed. The two light strips which laterally delineate the dark-colored signal part include target echoes of targets outside desired area 16; signal energy from these areas does not enter the SAR product. The light, hatched (triangular) areas in FIG. 2 include merely reception noise and no signal energy from target echoes.

Thus far, digital methods for the reduction of data only have been used to a very limited extent in space missions. The reason is that the radiation resistant, electronic components for the required data rate required for the digital data reduction so far have not been available.

An essentially natural method for data reduction is the adaptation of the sampling rate of the radar echo and the corresponding anti-aliasing filter to the used bandwidth. This method is, for example, applied to the satellites TerraSAR-X, TanDEM-X and PAZ. In this instance, three different sampling rates are available:

110 MHz for 100 MHz of signal bandwidth;
165 MHz for 150 MHz of signal bandwidth; and
330 MHz for 300 MHz of signal bandwidth.

Analogue anti-aliasing filters put in place upstream ensure the spectral limitation of the receiver noise.

Another data reduction method which has been used for a long time is deramping corresponding with the transformation of a time-frequency plane which enables extracting the desired signal by way of low-pass filtration. Unfortunately, deramping is only useful in very special cases, as illustrated in FIG. 3. In the time-frequency diagrams or spectrograms, the white area represents the reference data of a SAR echo in the time-frequency domain, while the grey rectangle represents the data to be recorded. If the ratio of the chirp-pulse length to the swath width is large (diagram above left), the deramping may significantly reduce the data volume (diagram lower left). In the case of a wide swath (right), there is no benefit.

Both methods described above use the characteristics of the receive signal only to a limited extent. An instrument having a plurality of different SAR modes requires a significantly more flexible method to reduce data.

An object of the present invention is to enable the improved reduction of data of a radar, for example, a SAR.

An underlying idea of the present invention is to specify a temporal receive window as a function of an area which is to be detected by a radar, in particular, as a function of a swath of a SAR, for a received radar echo signal of an emitted radar signal, which is a chirp-like transmit signal; to divide the received radar echo signal into spectral sub-bands; and to determine, for each spectral sub-band, a sub-band window which lies within the previously-specified temporal receive window. In doing so, the overall information content of interest of the received radar echo signal is included in the sub-band windows. The sub-band windows are activated within the temporal receive windows as a function of the receive time of the radar echo signal. The sampling rate for sampling the received radar echo signal is then adjusted as a function of the number of the sub-band windows active at the respective sampling instance. In other words, the procedure according to the present invention described above implements a variable sampling rate, as a result of which the data of the radar may be reduced. For this purpose, a chirp-like transmit signal is to be understood as a transmit signal which masks one or a plurality of frequency areas; that is, which has a time dependent transmit frequency. In this instance, linear and nonlinear, in particular, exponential chirps or chirp signals are typical examples. More generally, transmit signals, the spectrogram of which features a deterministic characteristic across one or a plurality of frequency ranges, are suitable for the purposes of the present invention. For the present invention, for example, a signal the spectrogram of which does not have a linear but a cloud-type curve would also be suitable. In this instance, it is only substantial that the short-term spectrum of the transmit signal shifts deterministically during the course of the transmit pulse so that it is possible to specify the sub-band window according to the receive signal emanating from the chirp-like transmit signal in such an appropriate manner that the overall information content of interest of the received radar echo signal is included in the sub-band windows and that, in this instance, at least one part of the sub-band window is shorter than the overall radar echo signal.

One embodiment of the present invention relates to methods for the reduction of receive data of a radar having the following steps: receiving a radar echo signal emanating from a chirp-like transmit signal; specifying a temporal receive window of the radar echo signal as a function of an area to be detected by the radar; dividing the radar echo signal into a plurality of spectral sub-bands; determining of sub-band windows for each spectral sub-band; activating the sub-band window within the temporal receive window of the radar echo signal as a function of the receive time of the radar echo signal; and sampling the radar echo signal by a sampling rate which is adjusted as a function of the number of the sub-band windows active at the respective sampling instance.

In particular, switch-on and switch-off instants for activating the respective sub-band windows are selected in such a manner that each sub-band window masks a temporal receive area of the radar echo signal in which the radar echo signal in the respective sub-band window includes information about the area to be detected by the radar.

The spectral sub-bands may be selected in such a manner that they have spectral ranges approximately equal in size.

Furthermore, a baseline sampling rate FS/M may be specified as a function of the spectrum of the radar echo signal and the number M of the spectral sub-bands and the sampling rate may be adjusted as a function of the baseline sampling rate.

The division of the received radar echo signals into a plurality of spectral sub-bands may be carried out in such a manner that each spectral sub-band directly borders at least one adjacent spectral sub-band.

In particular, the sampling values of the radar echo signal are, in conjunction with the switch-on and switch-off instants for activating the sub-band window, output as reduced receive data.

The reduced receive data may be further reduced by a block adaptive quantization.

A further embodiment of the present invention is a method for processing receive data of a radar, reduced by a method according to the present invention and as herein described, in which the signal represented by the receive data is digitally filtered by a filter bank configured to divide the signal into spectral sub-bands and to reduce the sampling rate according to the number of spectral sub-bands.

A modified Discrete Fourier Transform (DFT) filter bank is particularly used as a filter bank.

A further embodiment of the present invention relates to a computer program having a program code for carrying out all method steps according to the present invention and as herein described, if the computer program is carried out in a computer.

Furthermore, one embodiment of the present invention relates to a data carrier on which, according to the present invention and as previously described, the program code of the computer program executable by a computer is stored.

A further embodiment of the present invention relates to a device to reduce receive data of a radar having a receiver for a radar echo signal emanating from a chirp-like transmit signal, the receiver being configured in such a manner that a temporal receive window of the radar echo signal is specified as a function of an area to be detected by the radar, and a data reduction means for dividing the radar echo signal into a plurality of spectral sub-bands, for determining sub-band windows for each spectral sub-band, for activating the sub-band window within the temporal receive window of the radar echo signal and for sampling the radar echo signal by a sampling rate which is adjusted as a function of the number of the sub-band windows active at the respective sampling instance.

The means to reduce data may be particularly configured to carry out a method according to the present invention and as herein described.

A further embodiment of the present invention relates to a device for processing receive data of a radar which have been reduced by a device for reducing receive data of a radar according to the present invention and as herein described, having a filter bank for digitally filtering the signal represented by the receive data, and the filter bank is configured to divide the signal into spectral sub-bands and to reduce the sampling rate according to the number of spectral sub-bands.

The filter bank is particularly a modified DFT filter bank.

Further advantages and application possibilities of the present invention result from the subsequent description in conjunction with the exemplary embodiments illustrated in the drawings.

The description, the claims, the abstract and the drawings use the terms and assigned reference characters of the appended list of reference characters.

DESCRIPTION OF PREFERRED EMBODIMENTS

Figure 1:
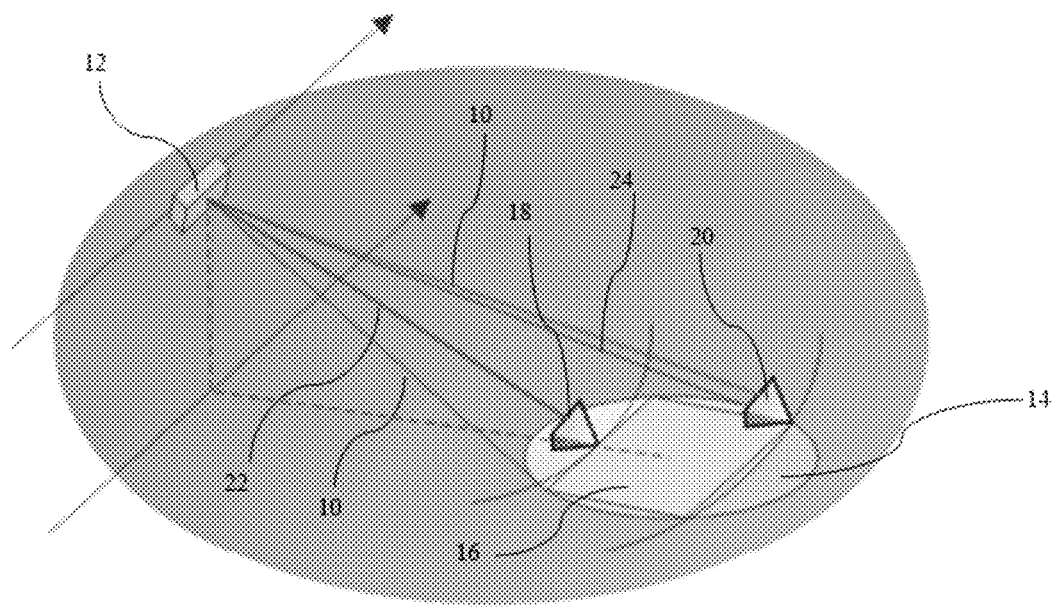
FIG. 1 shows the geometry of a SAR image recording generated by a flying SAR.

In the following descriptions, equal, functionally equal and functionally interconnected elements may be provided with the same reference characters. Absolute values are subsequently referenced only in an exemplary manner and are not to be understood to limit the present invention.

The method described in the following is not limited to detecting point targets; these are here only listed to illustrate the signal characteristics. In the subsequent description, the terms radar signal, (radar) echo (signal), (radar) receive signal, target echo and received signal reference a received radar signal.

Figure 4:
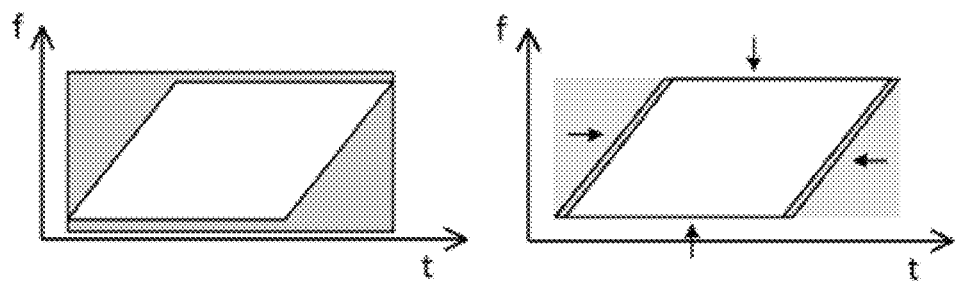
FIG. 4 shows a spectrogram of the reference data of a radar echo received by a SAR system before and after the reduction of the data volume by filtering which, according to the present invention, results from an adaptation of the sampling rate to the instantaneous bandwidth of the radar echoes.

The adaptation of the sampling rate of a received radar echo signal to the instantaneous bandwidth of the radar echo according to the present invention enables to optimize the accumulated data volume of the received radar signal. The recorded data volume (gray rectangle, left in FIG. 4) is, if possible, to be limited to the reference data (white area, left in FIG. 4). In particular, the accumulated data volume may be significantly reduced by out-filtering the light gray areas, as it is shown on the right in FIG. 4.

Figure 5:
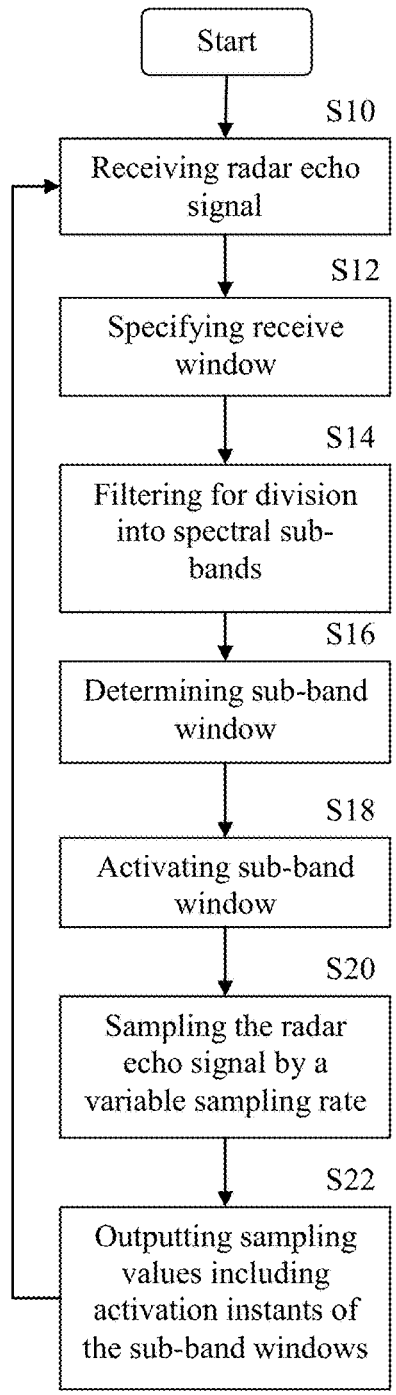
FIG. 5 shows a flow diagram of an exemplary embodiment of a method for reducing receive data of a SAR system according to the present invention.

A method for reducing receive data of a SAR system according to the present invention is now described on the basis of the flow diagram shown in FIG. 5 showing the individual method steps. This method may be, for example, implemented in the form of an algorithm in a computer program executed by a processor of a computer which, for example, may be provided on board of a SAR satellite for preprocessing and, in particular, for reducing data. The method may also be implemented by a device having a receiver for radar echo signals and means for reducing data which implement the subsequently described method steps. In this instance, parts of the receiver and the means for reducing data may be at least partially implemented in the software which is executed by a processor. Application specific components may, however, also be used to implement at least some of the functions.

The reduction of data by the method according to the present invention enables to efficiently use the bandwidth between the SAR satellite and a SAR processor, that is, a device for processing the SAR data, to generate images. Moreover, the subsequent description of the method refers to the spectrogram of a radar echo shown in FIG. 6.

First, in step S10, a radar echo signal is received. See also FIG. 1, reference characters 22 and 24. The received radar echo signal is a signal having a frequency bandwidth which corresponds with the bandwidth of the emitted radar signal, which is a chirp-like transmit signal, in particular, a chirp signal. An example of a typical spectrogram of such a radar echo signal is shown in the top diagram of FIG. 6. The spectrogram illustrated by the diagram shows the receive signal in the time-frequency plane.

Figure 2:
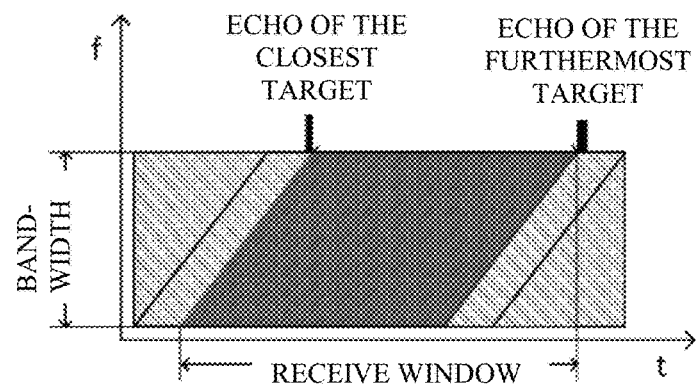
FIG. 2 shows a time-frequency diagram or a spectrogram having the assignment of targets to the radar receive signal of a SAR system.
Figure 3:
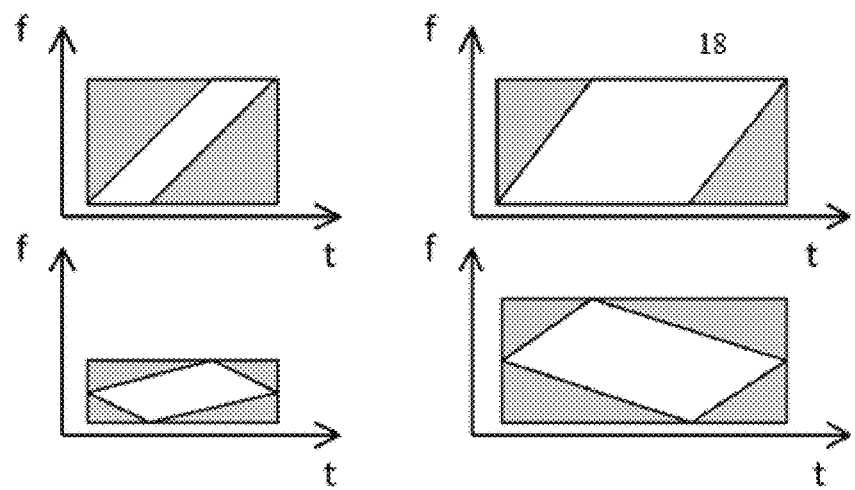
FIG. 3 shows a spectrogram of the reference data of a radar echo received by a SAR system before and after deramping.

As the radar is only to detect one specific area, as it has been described at the outset on the basis of the situation shown in FIG. 1, a temporal receive window of the radar echo signal is specified in step S12 as a function of the area to be detected which is determined by the echo of the closest and the furthermost target within the area to be detected; see also FIG. 2.

Figure 6:
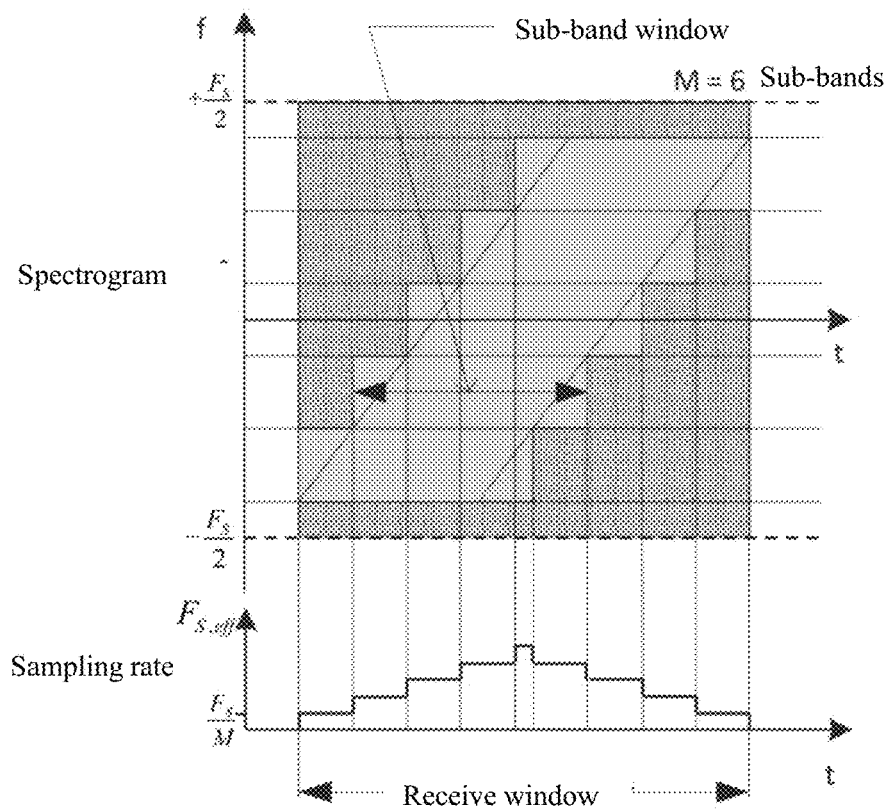
FIG. 6 shows a spectrogram of a radar echo or radar receive signal, and a division of the receive signal into spectral sub-bands and a temporal windowing of the sub-bands according to the present invention.

In step S14, the received signal or radar echo is divided into spectral sub-bands, in particular, by an appropriate filter. The division may be carried out so that the spectral sub-bands have spectral ranges approximately equal in size, meaning, that they have area[s] the frequency width of which are approximately equal in size. Moreover, the division may be carried out so that each spectral sub-band directly borders at least one spectral sub-band, and bordering includes also a partial overlapping of adjacent sub-bands or a small frequency gap between adjacent sub-bands. Such a division enables to continuously divide the frequency spectrum of the radar echo signal into sub-bands. Other divisions are also conceivable, for example, having specific distances between adjacent sub-bands as a result of which the slope of filters may be lower. The division of the spectrum of the radar echo signal does not have to be interconnected but may be composed by a plurality of components. In FIG. 6, the division of the frequency spectrum Fs of the radar echo signal in M=6 sub-bands. The method according to the present invention is, in principle, also suitable to handle signals which have spectral gaps. In particular, if said spectral gaps coincide with sub-band borders, then the sub-bands do not have to be directly adjacent to one another but gaps corresponding with the spectral gaps of the signal may exist between the individual sub-bands. Important for the subsequent reconstruction of the received signal is in this instance that the sub-bands mask the spectrum of the input signal or received signal.

In step S16, sub-band windows are determined within the receive window so that the overall information content of the radar echo in the corresponding sub-bands is included in the respective sub-band windows. As shown in FIG. 6, the individual sub-band windows of the respective sub-bands are shifted in time among one another. The sections of the sub-band signals outside of the sub-band window (dark-shaded in FIG. 6) may be discarded.

In step S18, the sub-band windows are activated within the receive window as a function of the receive time of the radar echo signal. FIG. 6 shows that the 6 sub-band windows are activated and again deactivated at different points in time. In this instance, the activating instants of each sub-band window depend on the area to be detected by the radar and the receive instants of echoes reflected from this area in the respective sub-band. In FIG. 6, the switch-on instants of each sub-band window are shifted in time by a multiple of an identical time interval dT, starting from starting time T0 of the receive window (from below, only the five sub-band windows are enumerated for detecting the overall information content of the radar echo):

Switch-on instant of first sub-band window t=T0+0*dT;
Switch-on instant of second sub-band window t=T0+1*dT;
Switch-on instant of third sub-band window t=T0+2*dT;
Switch-on instant of fourth sub-band window t=T0+3*dT;
Switch-on instant of fifth sub-band window t=T0+4*dT.

In FIG. 6, the switch-off instants of each sub-band window are shifted in time by a multiple of an identical time interval dT, starting from starting time T0 of the receive window and a time interval dTw for a section change (from below, only the five sub-band windows are enumerated for detecting the overall information content of the radar echo):

Switch-off instant of first sub-band window t=T0+4*dT+dTw+0*dT;
Switch-off instant of second sub-band window t=T0+4*dT+dTw+1*dT;
Switch-off instant of third sub-band window t=T0+4*dT+dTw+2*dT;

Switch-off instant of fourth sub-band window t=T0+ 4*dT+dTw+3*dT;

Switch-off instant of fifth sub-band window t=T0+4*dT+ dTw+4*dT.

The temporal windowing of the sub-bands shown in FIG. 6 is only an example and the identical time interval dT may also be variable.

In step S20, the radar echo signal is sampled. In this instance, the sampling rate approximates the instantaneous signal width in that it is adjusted as a function of the number of active sub-band windows at a respective sampling instance. The sampling rate may be adjusted as a function of a baseline sampling rate which, in turn, may be specified as a function of the spectrum of the radar echo signal and the number of the spectral sub-bands.

In FIG. 6, for example, a baseline sampling rate $F_S/M$ for M=6 spectral sub-bands and a bandwidth $F_S$ of the radar echo signal is specified and the sampling rate is adjusted to a value of $F_S/6$, $2*F_S/6$, $3*F_S/6$, $4*F_S/6$ or $5*F_S/6$ as a function of the active sub-band windows. Thus, the sampling rate changes over time in a step-shaped manner. In particular, the sampling rate results implicitly by selecting the sub-bands and the sampling rate is the sum of the sub-bands sampling rates of the active sub-bands.

In conjunction with the switch-on and switch-off instances, the sampling rates are output as reduced receive data of the radar echo signal to activate the sub-band windows in step S22. The data reduced in such a manner may now be transported further or stored.

Moreover, by appropriately determining the switch-on and switch-off instants of the sub-band signals or sub-band windows, non-linear frequency modulated chirp signals may be used. Equally, the signal spectrum does not have to be interconnected but could be combined from a plurality of components.

An additional reduction of the data volume is possible by a block adaptive quantization (BAQ) of the sub-band signals, as it is described in the technical book "Synthetic Aperture Radar Systems and Signal Processing", Curlander John C. and McDonough Robert N., New York, John Wiley & Sons, Inc., 1991.

In order to further process the radar signal, the sub-band signals have to be appropriately reconstructed into one individual signal. The decomposition of the receive signal into sub-bands and the reconstruction into an output signal is carried out by a filter bank. In this instance, the signal is, for example, divided into M=16 sub-bands of identical width and the sampling rate of the sub-bands is reduced by M (critical decimation).

In general, alias signals form during the decimation, which result into an unacceptable perturbation of the reference signal. For this reason, a so-called modified DFT filter bank (see also the scientific paper "Modified DFT filter banks with perfect reconstruction", Karp T. and Fliege N.J., IEEE Transactions on Circuits and Systems II: Analog and Digital Signal Processing.—1999.—Bd. 46.—S. 1404-1414.) may be used which, owing to its structure, may eliminate a portion of the alias signals. Remaining alias signals are either sufficiently suppressed by the filter attenuation or it is a mirror signal which has two effects:

These signals only appear at the outermost edge of the spectrum of the outer sub-bands.

The sign of the frequency modulation of these signals is inverted compared to the nominal radar signals.

Figure 7:
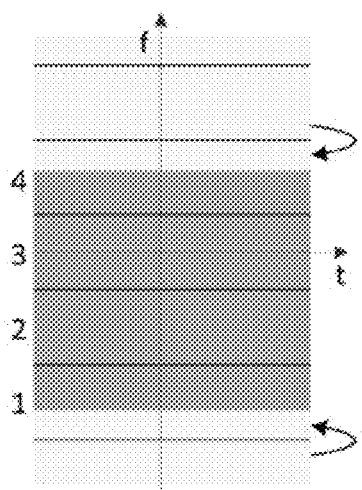
FIG. 7 shows aliasing of a modified DFT filter bank which, according to the present invention, is used to process a data-reduced radar receive signal according to the present invention.

In the following, the first point is briefly illustrates in reference to FIG. 7 which shows an aliasing of a modified DFT filter bank: The spectrum of the radar signal is illustrated in dark gray. For this purpose, the sub-bands 1 ... 4 (arbitrary numbering) are used. Energy is now transmitted from the spectral range above sub-band 4 and below sub-band 1 to the sub-bands 4 or 1. In this instance, receiver noise or other undesirable signals may occur. Owing to the filter characteristics and the special structure of this filter bank, this signal transmission only appears at the edges of these sub-bands. If the bandwidth of the reference signal is as shown in FIG. 7, no spectral overlapping occurs. If the bandwidth of the reference signal is greater, then the next, connected sub-bands have to be also transmitted. In addition to the output density of signals and noise, the exact instant is also a function of the slope of the filter edge, stop-band attenuation and the desired signal to noise ratio.

The second point gains importance in the area of the staircase in FIG. 6. Here, signal energy stemming from target echoes outside of the desired area (compare FIG. 1) is present in the spectral ranges of the non-transmitted sub-bands. Since these, however, are mirror signals, the sign of the frequency modulation is inverted to the nominal radar signal. In the subsequent processing of the radar signal, this mirror signal does not obtain any correlation gain and manifests itself in the final radar product merely as, for example, noise. Taking into account the filter slope and the stopband attenuation, appropriate instances for switching the sub-band signals may be determined so that the desired signal to noise ratio does not fall short.

A method for processing receive data which have been reduced by a method according to the present invention and as previously described may be implemented in the form of an algorithm into a computer program executed by a computer processor which is, for example, used as a SAR processor for image processing. The method may also be implemented by a device having a filter bank for digitally filtering by the signal represented by the receive data, in particular, a modified DFT filter bank configured to divide the signal into spectral sub-bands and to reduce the sampling rate according to the number of spectral sub-bands, as previously described. In this instance, parts of the filter bank may be at least partially implemented into software which is executed by a processor. Application specific components may, however, also be used to implement at least some of the functions, for example, FPGAs (field programmable gate arrays).

Figure 8:
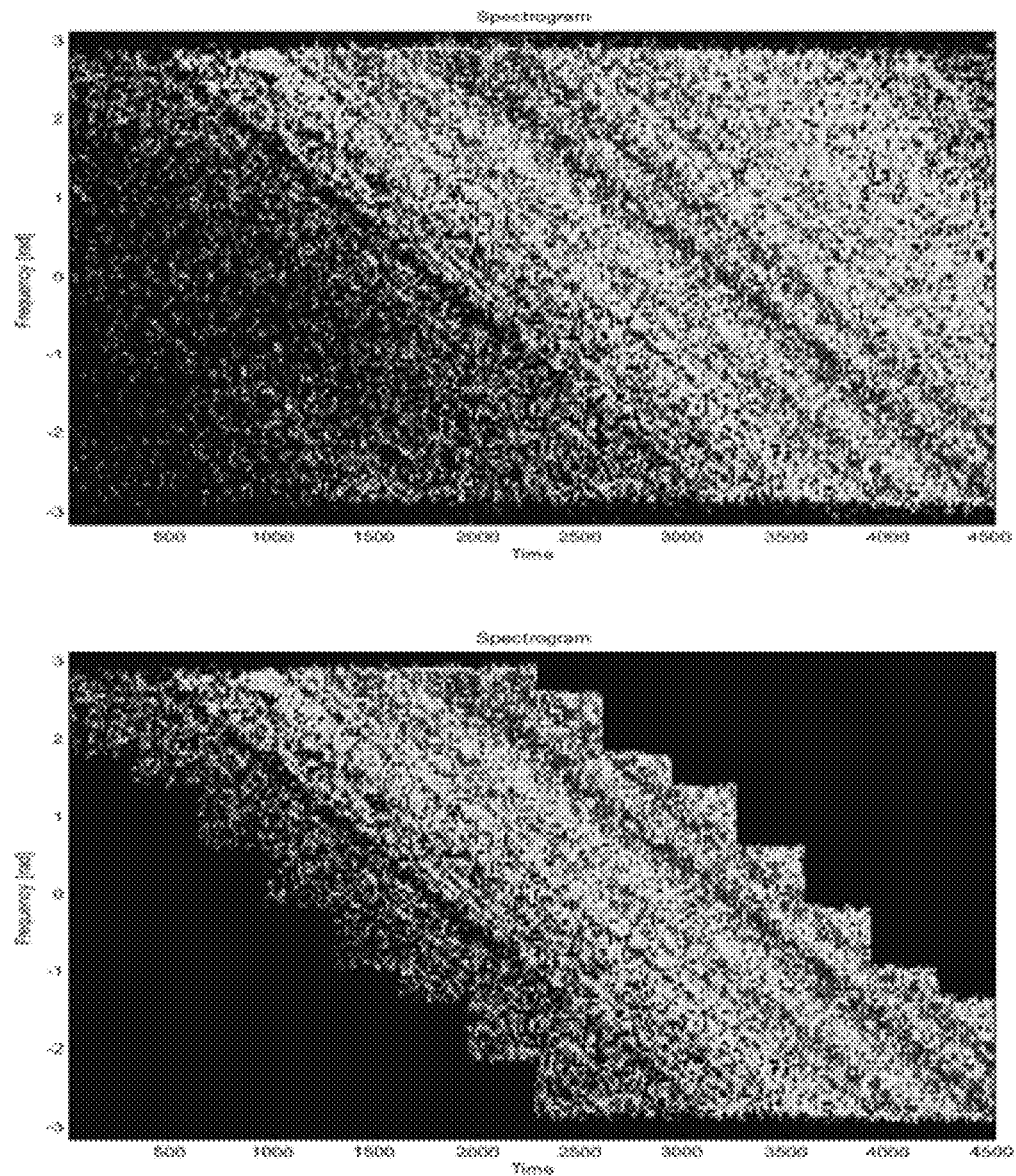
FIG. 8 shows a spectrogram of a radar pulse having original SAR data without and with a data reduction according to the present invention.

In FIG. 8, the spectrograms of a received radar echo signal without and with data reduction are shown as an example, that is, the spectrogram of a radar echo signal (pulse) having original SAT data from a TerraSAR recording without data reduction (top) and with data reduction (bottom) The frequency is here scaled to $\pm\pi$ and the time is arbitrarily scaled. In the selected example, the volume of the data reduction is 43%.

Figure 9:
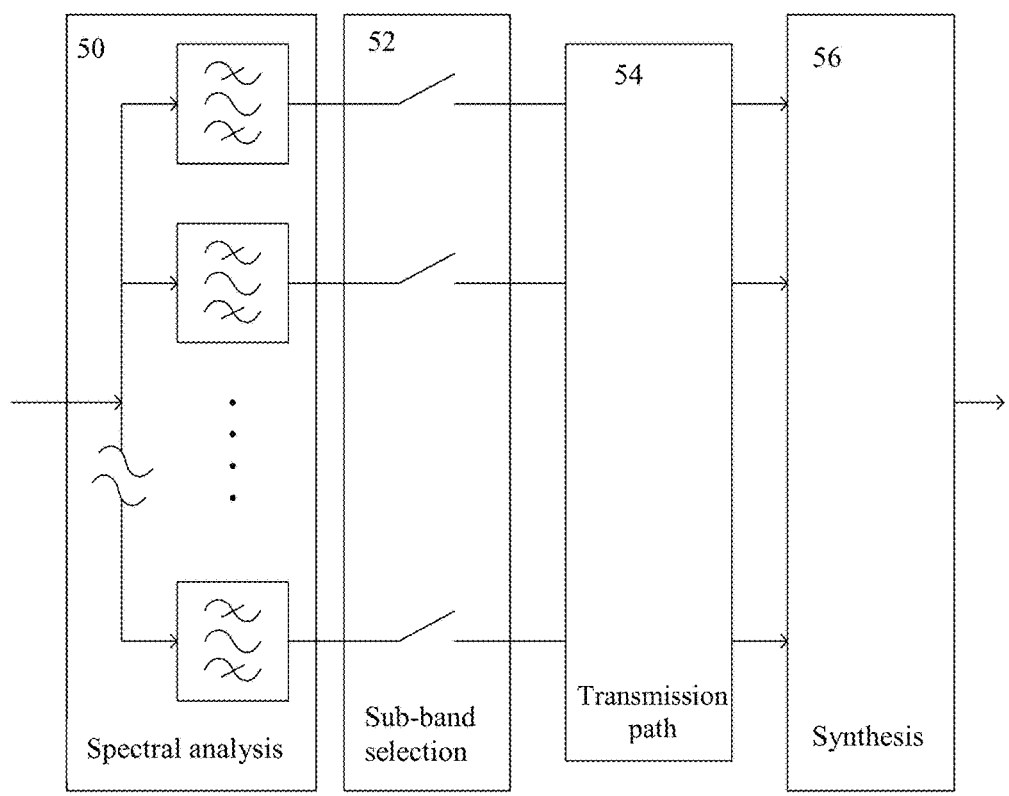
FIG. 9 shows a block diagram of a SAR system which includes an exemplary embodiment of a method for reducing receive data of a radar according to the present invention.

FIG. 9 shows a SAR system in which a data reduction device according to the present invention is used. The data reduction device has a spectral analysis device 50, which divides a received radar echo signal into a plurality of spectral sub-bands, and a sub-band selection device 52 which determines sub-band windows for each spectral sub-band, which activates the sub-band windows within the temporal receive window of the radar echo signal as a function of the receive time of the radar echo signal, and which samples the radar echo signal by a sampling rate which is adjusted as a function of the number of the sub-band windows active at the respective sampling instance. The receive data of the radar echo signal generated in this manner are transmitted via a transmission path 54, in particular, a radio transmission path, to a SAR synthesis device 56, which is implemented by a SAR processor and which, as described above, reconstructs the original radar echo signal from the reduced receive data of the radar echo signal.

REFERENCE CHARACTERS AND ACRONYMS

10 Chirp signal
12 SAR system
14 Area illuminated by SAR system 12
16 Desired area for generating images by SAR system 12
18 Target closest to SAR system 12 in area 16
20 Target furthermost from SAR system 12 in area 16
22 Radar echo signal of target 18
24 Radar echo signal of target 20
50 Spectral analysis device
52 Sub-band selection device
54 Transmission path for reduced SAR data
56 SAR synthesis device

What is claimed is:

1. A method for the reduction of receive data of a radar having the following steps:
   receiving a radar echo signal emanating from a chirp-like transmit signal;
   specifying a temporal receive window of the radar echo signal as a function of an area to be detected by a radar;
   dividing the received radar echo signal into a plurality of spectral sub-bands;
   determining sub-band windows for each of the plurality of spectral sub-bands;
   activating the sub-band windows within the temporal receive window of the radar echo signal as a function of a receive time of the radar echo signal;
   sampling the radar echo signal using a variable sampling rate that is adjusted as a function of a number of sub-band windows active at a respective sampling instance; and
   outputting sampling values of the radar echo signal as reduced receive data of the radar based on said sampling of the radar echo signal using the variable sampling rate.

2. The method according to claim 1, further comprising selecting switch-on and switch-off instants for activating the sub-band windows such that each sub-band window masks a temporal receive area in which the radar echo signal in the respective sub-band window includes information about the area to be detected by the radar.

3. The method according to claim 1, wherein the plurality of spectral sub-bands have spectral ranges approximately equal in size.

4. The method according to claim 1, further comprising:
   specifying a baseline sampling rate as a function of a spectrum of the radar echo signal and a number of the plurality spectral sub-bands; and
   adjusting the sampling rate as a function of the baseline sampling rate.

5. The method according to claim 2, further comprising:
   specifying a baseline sampling rate as a function of a spectrum of the radar echo signal and a number of the plurality spectral sub-bands; and
   adjusting the sampling rate as a function of the baseline sampling rate.

6. The method according to claim 1, wherein dividing the received radar echo signal comprises dividing the received radar echo signal into the plurality of spectral sub-bands such that each of the plurality of spectral sub-bands directly borders an adjacent one of the plurality of spectral sub-bands.

7. The method according to claim 2, wherein dividing the received radar echo signal comprises dividing the received radar echo signal into the plurality of spectral sub-bands such that each of the plurality of spectral sub-bands directly borders an adjacent one of the plurality of spectral sub-bands.

8. The method according to claim 4, wherein dividing the received radar echo signal comprises dividing the received radar echo signal into the plurality of spectral sub-bands such that each of the plurality of spectral sub-bands directly borders an adjacent one of the plurality of spectral sub-bands.

9. The method according to claim 2, further comprising outputting sampling values of the radar echo signal, in conjunction with the switch-on and switch-off instants for activating the sub-band windows, as the reduced receive data.

10. The method according to claim 5, further comprising outputting sampling values of the radar echo signal, in conjunction with the switch-on and switch-off instants for activating the sub-band windows, as the reduced receive data.

11. The method according to claim 7, further comprising outputting sampling values of the radar echo signal, in conjunction with the switch-on and switch-off instants for activating the sub-band windows, as the reduced receive data.

12. The method according to claim 9, further comprising reducing the reduced receive data by a block adaptive quantization.

13. The method according to claim 10, further comprising reducing the reduced receive data by a block adaptive quantization.

14. The method according to claim 11, further comprising reducing the reduced receive data by a block adaptive quantization.

15. A method for processing receive data of a radar comprising:
   reducing receive data of the radar by the method according to claim 1; and
   digitally filtering a signal represented by the receive data by a filter bank that is configured to divide the signal into the plurality of spectral sub-bands and to reduce the sampling rate according to a number of the plurality of spectral sub-bands.

16. The method according to claim 15, wherein the filter bank is a modified Discrete Fourier Transform filter bank.

17. A device for the reduction of receive data of a radar comprising
   a receiver for a radar echo signal emanating from a chirp-like transmit signal, wherein the receiver is configured such that a temporal receive window of a radar echo signal is specified as a function of the area to be detected by a radar;
   a spectral analysis device configured to divide the radar echo signal into a plurality of spectral sub-bands;
   a sub-band selection device configured to determine sub-band windows for each of the plurality of spectral sub-bands, to activate the sub-band windows within the temporal receive window of the radar echo signal, and to sample the radar echo signal by a variable sampling rate which is adjusted as a function of a number of sub-band windows active at a respective sampling instance.

18. A device configured to process receive data of a radar that has been reduced by a device according to claim 17, wherein the device configured to process receive data comprises a filter bank configured to digitally filter the signal represented by the receive data, and wherein the filter bank is further configured to divide the signal into the plurality of spectral sub-bands and to reduce the sampling rate according to the number of the plurality of spectral sub-bands.

19. The device according to claim 14, wherein the filter bank is a modified Discrete Fourier Transform filter bank.

* * * * *